US008653181B2

(12) United States Patent
Trezzi et al.

(10) Patent No.: US 8,653,181 B2
(45) Date of Patent: Feb. 18, 2014

(54) POLYMER AND USE THEREOF

(75) Inventors: Fabio Trezzi, Puteaux (FR); Antonio Marchetto, Saronno (IT); Giovanni Casati, Urgnano (IT)

(73) Assignee: Rhodia Operations, Aubervilliers (FR)

( * ) Notice: Subject to any disclaimer, the term of this patent is extended or adjusted under 35 U.S.C. 154(b) by 743 days.

(21) Appl. No.: 12/599,198

(22) PCT Filed: Apr. 24, 2008

(86) PCT No.: PCT/EP2008/055026
§ 371 (c)(1), (2), (4) Date: May 18, 2010

(87) PCT Pub. No.: WO2008/135403
PCT Pub. Date: Nov. 13, 2008

(65) Prior Publication Data

US 2010/0240822 A1 Sep. 23, 2010

(30) Foreign Application Priority Data

May 7, 2007 (EP) .................................... 07290574

(51) Int. Cl.

| | |
|---|---|
| ***C08F 212/08*** | (2006.01) |
| ***C08F 220/18*** | (2006.01) |
| ***C08F 230/04*** | (2006.01) |

(52) U.S. Cl.
USPC .......................................... 524/543; 526/274

(58) Field of Classification Search
USPC .......................................... 526/274; 524/543
See application file for complete search history.

(56) References Cited

U.S. PATENT DOCUMENTS

| | | | | |
|---|---|---|---|---|
| 5,463,101 A | | 10/1995 | Reierson | |
| 5,550,274 A | | 8/1996 | Reierson | |
| 5,554,781 A | | 9/1996 | Reierson | |
| 6,444,747 B1 | | 9/2002 | Chen et al. | |
| 6,641,754 B2 | | 11/2003 | Buentello et al. | |
| 6,841,655 B1 | * | 1/2005 | Gota et al. | 528/425 |

FOREIGN PATENT DOCUMENTS

| | | | | |
|---|---|---|---|---|
| EP | 0675076 | | 10/1995 | |
| JP | 11-309361 | * | 9/1999 | B01F 17/14 |
| JP | 11309361 A | * | 11/1999 | B01F 17/14 |

* cited by examiner

*Primary Examiner* — Ling Choi
*Assistant Examiner* — Chun-Cheng Wang
(74) *Attorney, Agent, or Firm* — Hunton & Williams LLP

(57) ABSTRACT

The invention relates to new copolymers comprising a special phosphate functional monomer, and to uses thereof for example in coatings. The new copolymers can impart improved scrub resistance to said coatings.

22 Claims, No Drawings

POLYMER AND USE THEREOF

CROSS-REFERENCE TO RELATED APPLICATIONS

This application is the U.S. National Phase Application of International Application No. PCT/EP2008/055026, filed Apr. 24, 2008, which claims the benefit of European Application No. EP 07290574.8, filed May 7, 2007.

FIELD OF THE INVENTION

The invention relates to new copolymers comprising a special phosphate functional monomer, and to uses thereof for example in coatings. The new copolymers can impart improved scrub resistance to said coatings.

BACKGROUND OF THE INVENTION

Functional monomers comprising a phosphate group are known. Such monomers are for example useful as co-monomers to modify the properties of a copolymer. For example some phosphate containing monomers have been described and used to improve adhesion of coatings to metallic substrate.

Document US 2003/00552303 (Buentello) describes a method of controlling scale deposition with a water soluble copolymer comprising units deriving from allylpolyethoxyphosphate monomer.

Phosphate of hydroxyethylmethacrylate (also referred to as phosphoethyl methacrylate "PEM") has been taught as useful to impart scrub resistance to coatings comprising emulsion polymers obtained therewith, and having a high pigment volume concentration. However the scrub resistance improvement with this monomer is not very high and/or does not allow reducing the amount of polymer being used. Also, quite high amounts of the monomer in the polymer are necessary.

There is a need for polymers and/or coatings comprising the polymers with improved scrub-resistance performance, especially for coating compositions having a somehow high pigment volume concentration. There is more particularly a need for polymers that can:

impart to a coating identical scrub-resistance with lower or equal to amounts of polymer, and/or impart to a coating higher scrub-resistance with identical amount of polymer.

There is a need for functional comonomers that can:

impart identical scrub-resistance to polymers in coatings, with lower or equal to amounts of functional comonomers in the polymers, and/or impart higher scrub-resistance to polymers in coatings, with identical amounts of functional comonomers in the polymers.

SUMMARY OF THE INVENTION

The invention addresses at least one of the needs above. Thus the invention relates to a copolymer comprising:

units A deriving from at least one ethylenically unsaturated non-ionic water-insoluble monomer A, and units B deriving from a monomer B of formula (I):

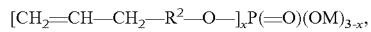

$$[CH_2{=}CH{-}CH_2{-}R^2{-}O{-}]_xP({=}O)(OM)_{3-x},$$

wherein:

$R^2$ is a linking divalent group, preferably a (poly)oxyalkylene group, x is a number average number of from 1 to 2, M, identical or different, is a hydrogen atom or a cationic counter-ion.

The invention also relates to a process of preparing a copolymer comprising the steps of step I) preparing the monomer B of formula (I)

step II) copolymerizing a mixture of monomers comprising monomer(s) A and monomer B.

The invention also relates to new compositions of matter, having compounds of formula (I), and to processes for preparing the same.

The invention also relates to the use of the copolymer of the invention in a coating composition. The invention also relates to a coating composition comprising the copolymer of the invention. The invention also relates to a method of coating a substrate with the copolymer or with the coating composition. The invention also relates to substrates coated with the copolymer or with the composition.

The invention also relates to the use of the monomer B of formula (I) and/or to the use of the copolymer to impart scrub resistance.

The invention can also allow obtaining emulsion copolymers with in an efficient way, with using less surfactant(s). The invention can also allow obtaining emulsion copolymers with particularly good characteristics, especially with a low grit and/or coagulum.

DETAILED DESCRIPTION OF THE INVENTION

Units B—Monomer B

Units B are allylic units deriving from monomer B. Monomer B is an allylic monomer of formula (I):

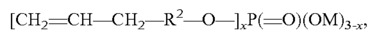

$$[CH_2{=}CH{-}CH_2{-}R^2{-}O{-}]_xP({=}O)(OM)_{3-x},$$

wherein:

$R^2$ is a linking divalent group, preferably a (poly)oxyalkylene group, x is a number average number of from 1 to 2, M, identical or different, is a hydrogen atom or a cationic counter-ion.

If M is a hydrogen atom, monomer B is considered as being in an acid form. If M is a counter-ion, monomer B is considered as being in a salt form or in a neutralized form. Monomer B can be partially acidic and partially neutralized. M can be for example $NH_4^+$, $Na^+$ or $K^+$. Neutralization can occur upon addition of the monomer in the polymerization medium.

Monomer B can be a mixture of a mono phosphate ester (or "monoester") with x=1, and a di phosphate ester (or "diester") with x=2. The respective amounts of monoester and diester are such that x is equal to or higher than 1, for example equal to or higher than 1.01, and equal to or lower than 2, for example equal to or lower than 1.99. Preferably, monomer B comprises a high amount of monoester, with a high ratio of monoester to diester. Number x can be for example of from 1 to 1.5. Advantageously, x is of from 1 to 1.2, preferably of from 1.01 to 1.2. It is mentioned that x=1.2 corresponds to a molar ratio monoester/diester of 80/20.

It has been found, surprisingly, that monomer B with a lower higher ration monester/diester (lower number x) imparts higher scrub-resistance.

Group $R^2$ is a linking divalent group, preferably comprising carbon atoms, and optionally heteroatoms. Examples of groups $R^2$ include divalent alkylene groups with from 2 to 20 carbon atoms and (poly)oxyalkylene groups.

Preferably group $R^2$ is a (poly)oxyalkylene group of formula —[O-A-]$_n$-, wherein:

A, identical or different, is a group of formula —$CH_2$—$CH_2$— or —$CH_2$—$CH(CH_3)$—, or —$CH(CH_3)$—$CH_2$—, and n is an average number of at least 1.

Groups —O-A- wherein A is —$CH_2$—$CH_2$— correspond to ethoxy groups that can be obtained from ethylene oxide. Groups —O-A- wherein A is or —$CH_2$—$CH(CH_3)$— or —$CH(CH_3)$—$CH_2$— correspond to propoxy groups that can be obtained from propylene oxide. (Poly)oxyalkylene groups of formula —$[O\text{-}A\text{-}]_n$- can comprise both ethoxy groups and propoxy groups, arranged randomly or by blocks.

Preferably $R^2$ is a polyoxyethylene group of formula —$[O—CH_2—CH_2]_n$—, wherein n is an average number of from 2 to 10, preferably of from 2.5 to 7.

Monomer B of formula (I) can be comprised in a composition of matter having the compound of formula (I) and other compounds such as by products and/or residual products. The composition of matter is typically the reaction product of a phosphation step used to prepare monomer B. Processes useful for preparation the monomers, including phosphation steps are detailed below.

A composition of matter that can be used has:

the compound of formula (I)

optionally an alcohol compound of formula $CH_2$═CH—$CH_2$—$R^2$—OH, advantageously in an amount such that the molar ratio between the alcohol compound and the compound of formula (I) is up to 20/80, and optionally phosphoric acid, advantageously in an amount such that the molar ratio between the phosphoric acid and the compound of formula (I) is up to 30/70, preferably up to 25/75.

A composition of matter having:

an alcohol compound of formula $CH_2$═CH—$CH_2$—$R^2$—OH, in an amount such that the molar ratio between the alcohol compound and the compound of formula (I) is up to 20/80, and phosphoric acid, in an amount such that the molar ratio between the phosphoric acid and the compound of formula (I) is up to 30/70, preferably up to 25/75, and the compound of formula (I) with x being of from 1 to 1.2, preferably of from 1.01 to 1.2, said composition of matter being designated as "preferred phosphation adduct", is especially useful as it imparts surprisingly good scrub resistance and can be obtained with an especially practical preparation process (detailed below).

Monomer B, including compositions of matter comprising the compound of formula (I), can be prepared by a process comprising the step of phosphating a compound of formula $CH_2$═CH—$CH_2$—$R^2$—OH (hereafter "alcohol"). Some such alcohols are commercially available. In the embodiment wherein $R^2$ is a (poly)oxyalkylene group, the alcohol can be obtained by reacting allyl alcohol with an alkylene oxide, for example with ethylene oxide (ethoxylation) and/or propylene oxide (propoxylation). These reactions are known by the one skilled in the art.

The phosphation can be performed by any conventional process, for example by reacting the alcohol with phosphorus pentoxide ($P_2O_5$). Phosphation is a process known in the art of making phosphated monomers or phosphated surfactants. It is mentioned that phosphation can be performed in the presence of minor amounts hypophosphorous acid to prevent some undesired reactions. Hypophosphorous acid can be used as an anti-oxidant.

According to a preferred embodiment, the phosphation is carried out by a process leading to high ratios of monoesters to diesters. In still a preferred embodiment the process leading to high ratios of monoesters to diesters is performed without purification steps and leads directly to a phosphation adduct presenting high ratios of monoesters to diesters, with low amounts of residual alcohol and/or low amount of residual phosphoric acid. Preferably the process leads to the preferred phosphation adduct identified above.

A first method for making the preferred phosphation adduct involves preparing a special slurry or paste phosphation agent. Such a first method comprises the steps of:

a) preparing a slurry or paste reagent composition by intimately blending and exclusively reacting, at from about room temperature to about 80° C. or the ultimate phosphation reaction temperature, an effective amount of phosphoric anhydride with from about 75 weight percent to about 117 weight percent phosphoric acid, said reagent composition having an effective equivalent polyphosphoric acid weight percent of from about 118 to about 125; and b) reacting said reagent composition with at least one alcohol of the formula $CH_2$═CH—$CH_2$—$R^2$—OH, typically for a reaction time of from about 4 to about 12 hours;

wherein:

in the resulting ester compositions, the mono-ester to di-ester number ratio is greater than 80:20, and the resulting product optionally but preferably presents the at least one of the following features:

the molar ratio between residual alcohol and the compounds mono-ester and di-ester is of up to 20/80, and/or the weight percent of residual alcohol to the total amount of reaction product is of up to 6%, and/or the molar ratio between residual (poly)phosphoric acid and the compounds mono-ester and di-ester is of up 30/70, preferably of up to 25/75, and/or the weight percent of residual (poly)phosphoric acid to the total amount of reaction product is of up to 6%.

A second method for making the preferred phosphation adduct involves preparing a phosphation agent in situ. Such a second method comprises the steps of:

A) preparing a phosphoric acid-alcohol reactant solution by i) dissolving a) from about 75 weight % to about 117 weight % phosphoric acid in b) at least one alcohol medium of the formula $CH_2$═CH—$CH_2$—$R^2$—OH, wherein $R^1$ and $R^2$ are as defined above, under essentially non-reactive temperature conditions;

B)

i) intimately blending a stoichiometrically effective amount of phosphoric anhydride into said reactant solution and ii) reacting exclusively the phosphoric acid in said reactant solution with the stoichiometrically effective amount of phosphoric anhydride to produce in-situ a phosphation reagent having an effective equivalent polyphosphoric acid weight percent of from about 118 to 125; and C) reacting the phosphation reagent so produced with the alcohol medium, typically at from about 75° C. to about 100° C. for a reaction time of from about 4 to about 12 hours, wherein:

in the resulting ester compositions, the mono-ester to di-ester number ratio is greater than 80:20, and the resulting product optionally but preferably presents the at least one of the following features:

the molar ratio between residual alcohol and the compounds mono-ester and di-ester is of up to 20/80, and/or the weight percent of residual alcohol to the total amount of reaction product is of up to 6%, and/or the molar ratio between residual (poly)phosphoric acid and the compounds mono-ester and di-ester is of up 30/70, preferably of up to 25/75, and/or the weight percent of residual (poly)phosphoric acid to the total amount of reaction product is of up to 6%.

Such first and second methods are detailed, for alcohols in general for example for alkyl alcohols in U.S. Pat. Nos. 5,463,101, 5,550,274 and 5,554,781, as well as in EP Patent publication number EP 0 675,076 A2, especially as described in Example 18 of the EP publication. These documents are incorporated by reference.

Copolymer—Polymerization

The copolymer of the invention comprises:

units A deriving from at least one ethylenically unsaturated non-ionic water-insoluble monomer A, and units B deriving from a monomer B of formula (I).

The copolymer can further comprise units C, deriving from at least one ethylenically unsaturated water-soluble monomer C.

The copolymer can typically and preferably be an aqueous emulsion copolymer. Such copolymers are also referred to as latexes. Such copolymers are particularly suitable for coatings. They can have an average particles diameter of from 70 to 500 nm.

The copolymer, preferably an aqueous emulsion copolymer, can comprise from 0.05 to 10% by weight, preferably from 0.2% to 2%, preferably from 0.5 to 1.5%, of units B. In the present application the amounts of units are considered as being equal to the amounts of monomers engaged to prepare the copolymer.

Hydrophilic monomers C, if present, are typically used in an amount of less then 40% by weight, for example less than 30%, for example less than 20%.

The copolymers can for example be polymers referred to as (with reference to monomer(s) A):

Acrylic based latexes
Styrene/Acrylic based latexes
Vinyl/Acrylic based latexes
vinyl chloride based latexes
Styrene/Acrylonitrile (SAN) based latexes
Butadiene based latexes
Vinyl acetate based latexes
Vinyl Veova based latexes
Styrene/butadiene based latexes
Vinyl acetate/Veova based latexes In the above "based" means that the polymer chains comprise at least 33% by weight, preferably at least 50% by weight of the monomers mentioned before. If two monomers or monomer families are mentioned it is preferred that the weight ratio between them be of from 5/95 to 95/5, preferably from 10/90 to 90/10. Of course some further different monomers can be used.

In a particularly useful embodiment of the invention, the copolymer is a copolymer obtained from:

(a1) from 20 to 80 parts by weight of acrylic esters (Monomer A), (a2) from 20 to 80 parts by weight of vinyl aromatic compounds (Monomer A), (b) from 0.05 to 10% parts weight, preferably from 0.2% to 2%, preferably from 0.5 to 1.5%, of monomer B (c) optionally, up to 10 parts by weight of ethylenically unsaturated carboxylic acids and/or dicarboxylic acids (Monomer C), preferably from 0.1 to 10 parts by weight, Some of these polymers are often referred to as "Styrene/Acrylic" latexes, as monomer A is typically a mixture of an acrylic ester such as butyl acrylate and of styrene.

Processes for preparing the copolymers are known by the one skilled in the art. The process involves copolymerizing a mixture of monomers comprising monomer(s) A and monomer B, and optionally monomer C.

Hence a complete method of preparing the copolymer of the invention comprises the steps of:

step I) preparing monomer B of formula (I)

step II) copolymerizing a mixture of monomers comprising monomer(s) A and monomer B.

Step I) has been detailed above.

Step II) can be performed by any polymerization procedure, especially by any aqueous emulsion polymerization procedure. These are known by the one skilled in the art. One can for example perform a free-radicals emulsion polymerization involving a source of free radicals.

Emulsion polymerization processes leading to aqueous dispersions of polymers are known by the one skilled in the art. These processes typically involve combining water, initiator(s) and hydrophobic monomers, in the presence of at least one emulsifier, for example a surfactant. These processes are often referred to as latex processes. Any process can be used, including:

so called seeded processes or non-seeded processes, processes with progressive or non progressive introduction of monomers, processes with progressive or non progressive introduction of surfactants, processes using water-soluble initiators or water-insoluble initiators, and/or processes involving introduction of a pre-emulsion of monomers, said pre-emulsion optionally comprising at least one emulsifier, for example a surfactant, processes that combine some of the above.

Monomer B can be introduced progressively or non progressively in the polymerization medium.

Initiators that can be use are known by the one skilled in the art. Examples mentioned in particular are organic and/or inorganic peroxides, such as alkali metal peroxydisulphates, persulfates and/or azo compounds, or combined systems composed of at least one organic reducing agent and at least one peroxide and/or hydroperoxide such as, for example, tert. butyl hydroperoxide and the sodium salt of hydroxymethanesulphinic acid, or hydrogen peroxide and ascorbic acid, or combined systems containing in addition a small quantity of a metal compound which is soluble in the polymerisation medium and the metallic component of which can be present in several valence states, for example, ascorbic acid/iron(II) sulphate/hydrogen peroxide. In the latter example, the sodium metal salt of hydroxymethanesulphinic acid, sodium sulphite, sodium hydrogen sulphite and/or sodium metal disulphite are also frequently used instead of ascorbic acid, and tert. butyl hydroperoxide or alkali metal peroxydisulphates and/or ammonium peroxydisulphate instead of hydrogen peroxide. A combination of water-soluble Fe/V-salts is frequently used instead of a water-soluble iron(II) salt.

Preferred water-soluble initiators include at least one compound selected from the group consisting of organic peroxides, inorganic peroxides, and azo compounds.

The initiator system, according to its consumption in the course of the radical aqueous emulsion polymerisation, may be added continuously or gradually. This depends in particular, in a known per se manner, both on the chemical nature of the initiator system and on the polymerisation temperature. Peroxides, for example, alkali metal peroxydisulphates such as sodium peroxydisulphate or ammonium peroxydisulphate are particularly preferred.

The most favourable quantity of water-soluble initiators can easily be determined by appropriate preliminary tests. Conventionally the water-soluble initiators are added in a quantity of from 0.1 to 2.0 wt. %, referred to the total mass of the monomers being polymerised.

Furthermore, the known molecular-weight controllers such as mercapto compounds, for example, tertiary dodecyl mercaptan or dimeric α-methylstyrene, can still be added for the emulsion polymerisation according to the invention. In addition still further auxiliary substances such as complexing agents, for instance, to control interfering metal ions, and inhibitors, for example hydroquinone monomethyl ether, can be added to the emulsion polymerisation. The molecular-weight controllers and the auxiliary substances are known and are described, for example, in Houben-Weyl, Methoden der organischen Chemie, Vol. XIV/1, page 297 ff., 1961, Stuttgart.

The emulsifiers used in the polymerization process can be surfactants. Suitable surfactants include for example ethoxylated and/or propoxylated fatty alcohols, esters or half-esters of alkylpolyoxyethylene sulphosuccinates can be used as emulsifiers. Here the sulphosuccinic acid is esterified singly or doubly with poly- or oligoethylene oxide having 2 to 30 ethylene oxide units, preferably 2 to 20 ethylene oxide units, in particular 2 to 10 ethylene oxide units, the end group of the above-mentioned esters and half-esters comprising an alkyl group having 8 to 18 carbon atoms which is straight-chain or branched. The following are mentioned in particular as alkyl groups containing $C_8$-$C_{18}$ carbon atoms: caprylic alcohol, capric alcohol, lauryl alcohol, myristyl alcohol, stearyl alcohol or elaidic alcohol.

The emulsifiers are used preferably in quantities of from 0.2 to 4.5 parts by weight, referred to 100 parts by weight of the monomers.

The process can be governed to obtain some preferred features for the copolymer, such as particles size. For example the rate of metering the emulsifiers during the emulsion polymerisation can be governed by the intended particle size of the final polymers and by the reaction rate and can easily be determined by several preliminary tests. Polymerisation pressure and polymerisation temperature are however of fairly minor importance. The reaction is generally carried out at temperatures of between 20° C. (room temperature) and 100° C., preferably at temperatures of 60° C. to 95° C.

After completion of the actual polymerisation process, stirring is preferably continued for several more hours with the polymerisation temperature being maintained. This can be followed by conventional steps for removing the residual monomers, for adjusting the pH value or by other methods for finally establishing particular properties.

Monomer A can be selected from the following:

Conjugated aliphatic dienes, such as butadiene, isoprene, 1,3-pentadiene, dimethylbutadiene and/or cyclopentadiene.

Vinyl aromatic compounds such as styrene, alpha.-methylstyrene and/or vinyltoluene.

Ethylenically unsaturated carboxylic acid nitriles, such as acrylonitrile and/or methacrylonitrile esters of acrylic and/or methacrylic acid wherein the alkyl group contains 22 or fewer carbon atoms, such as methyl acrylate, methyl methacrylate, ethyl(meth)acrylate, isopropyl(meth)acrylate, butyl(meth)acrylate, 2-ethylhexyl(meth) acrylate, allyl esters of saturated mono-carboxylic acids, vinyl esters, vinyl ethers, vinyl ketones, dialkyl esters of unsaturated dicarboxylic acids, vinyl acetate and/or vinylpyridine, vinyl chloride, vinylidene chloride, and mixtures thereof.

Preferably, units A derive from the following monomers A:

Styrene, alkyl acrylate or methacrylate, wherein the alkyl is a $C_1$-$C_{12}$ alkyl, and mixtures thereof.

Monomer C can be selected from the following:

Ethylenically unsaturated carboxylic acids and/or dicarboxylic acids; such as α,β-monoethylenically unsaturated mono- and dicarboxylic acids having 3 to 6 C atoms such as, for example, acrylic acid, methacrylic acid, maleic acid, fumaric acid, itaconic acid, acrylamide, and mixtures thereof.

Preferably, units C derive from the following monomers C:

acrylamide acrylic acid, methacrylic acid, and mixtures thereof.

The monomers and amounts thereof (especially monomer(s) A and amounts thereof) are preferably such that copolymer has a glass transition temperature of from −20° C. to 60° C., preferably of from 0 to 40° C.

Coatings

The copolymer of the invention can be used in a coating composition. The coating composition can be in a dispersed form (prior to application onto a substrate to be coated), or in a dried form (after application onto a substrate to be coated). Coating compositions in a dispersed form, comprising aqueous emulsion polymers, are known by the one skilled in the art. The coating composition can be for example an industrial paint or a domestic, decorative paint. The substrate coated can be for example an interior surface of a building, such as a wall or a ceiling. The coating composition can be applied onto the substrate by any conventional mean, for example by a spay, a roller, a brush etc. . . . .

Typically the coating composition will comprise:

the copolymer at least one pigment, and optionally further additives.

The coating composition can have a pigment volume concentration (PVC) of from 20 to 95, preferably of from 60 to 95, preferably of from 75 to 95. The invention is particularly useful at higher pigment volume concentrations. The coating composition will preferably be a mat paint.

The PVC can be calculated as known by the one skilled in the art, as follows:

$$PVC(\%) = \frac{\text{volume of pigment(s)} + \text{volume of extender(s)}}{\text{total dry volume of composition}} * 100$$

Pigments include particulate inorganic materials which are capable of materially contributing to the opacity or hiding capability of a coating. Such materials typically have a refractive index of greater than 1.8 and include, for example, titanium dioxide, zinc oxide, zinc sulfide, and the like. Preferred is titanium dioxide.

Extenders include particulate inorganic materials having a refractive index of less than or equal to 1.8 and greater than 1.3 and include, for example, calcium carbonate, clay, calcium sulfate, aluminosilicates, silicates, zeolites, and diatomaceous earth.

The coating composition may optionally contain solid or voided polymer particles having a Tg of greater than 30° C., said polymer being different from the copolymer of the invention; such polymer particles are classified as extenders for purposes of PVC calculation.

Examples of further additives include: tackifiers, emulsifiers, coalescing agents, solvents and co-solvents, buffers, neutralizers, thickeners, rheology modifiers, humectants, adhesion promoters, wetting agents, biocides, plasticizers, anti-foaming agents, colorant, waxes, anti-oxidants.

Some illustrative but non-limiting examples are provided hereunder for the better understanding of the invention.

EXAMPLES

Example 1-2

Preparation of Phosphate Monomers of Formula (I)

Example 1

Preparation of monomer "AAE3.5-P" of formula $[CH_2{=}CH{-}CH_2{-}(O{-}CH_2{-}CH_2)_{3.5}{-}O{-}]_xP({=}O)(OH)_{3-x}$ wherein x>1.2

Starting Material:

RHODASURF AAE/3.5 (Allyl Alcohol 3.5EO) 82.17 wt %

PHOSPHOROUS ACID 70% 0.40 wt %

PHOSPHORUS PENTOXIDE 16.93 wt %

HYDROGEN PEROXIDE 130 vol. 0.50 wt %

Reaction Procedure:

1) Charge the RHODASURF AAE/3.5 and the PHOSPHOROUS ACID 70%, and heat at 50° C. with $N_2$ sparge.

2) Add in 15 h at T=55° C.+-3° C. the PHOSPHORUS PENTOXIDE

3) Mix 2 h after the PHOSPHORUS PENTOXIDE addition.

4) Heat at 80° C., and hold at 80° C. for 4 hours.

5) At 80° C. add the HYDROGEN PEROXIDE 130 vol.

6) Hold at 80° C. for 4 h. Cool to 30° C. and discharge.

$NMR^{31}P$ analysis indicates that the molar ratio between monoester (x=1) and diester (x=2) is of about 61/34. Number average is (61*1+34*2)/(61+34)=1.36.

Example 2

Preparation of monomer "AAE3.5-SP" of formula $[CH_2{=}CH{-}CH_2{-}(O{-}CH_2{-}CH_2)_{3.5}{-}O{-}]_xP({=}O)(OH)_{3-x}$ wherein x<1.2

Starting Material:

| | |
|---|---|
| RHODASURF AAE/3.5 (Allyl Alcohol 3.5EO) | 72.95 wt % |
| HYPOPHOSPHOROUS ACID 50% | 0.40 wt % |
| POLYPHOSPHORIC ACID 1151%(PPA) | 16.68 wt % |
| PHOSPHORUS PENTOXIDE | 9.47 wt % |
| HYDROGEN PEROXIDE 130 vol. | 0.50 wt % |

Reaction Procedure:

Step A

1) Charge the RHODASURF AAE/3.5 and the HYPOPHOSPHOROUS ACID 50% and heat at 45° C. with $N_2$ sparge.

2) Add in 3 h at T=45° C.+/−3° C. the POLYPHOSPHORIC ACID 115%

Step B i)

3) Mix 1 h after PPA addition.

Step B ii)

4) Heat to 55° C. and add in 10 h at T=55° C.+−3° C. the PHOSPHORUS PENTOXIDE

5) Mix 1 h after the PHOSPHORUS PENTOXIDE addition.

Step C

6) Heat at 80° C., and hold at 80° C. for 20 hours.

7) At 80° C. add the HYDROGEN PEROXIDE 130 vol.

8) Hold at 80° C. for 4 h. Cool to 30° C. and discharge.

$NMR^{31}P$ analysis indicates that the molar ratio between monoester (x=1) and diester (x=2) is of about 71/10. Number average is (71*1+10*2)/'(71+10)=1.12

Examples 3-6

Polymers and Evaluations

Styrene/Butyl acrylate based copolymer are prepared with using as comonomers the monomers of examples 1-2, or the following comparative comonomer:

Albritech 6835 ("A6835"), Rhodia: Phosphate of hydroxyethylmethacrylate

In the examples the letter "C" refers to a comparative example.

Polymer dispersions (latex) are prepared by emulsion polymerization according to the following recipe and polymerization procedure.

Polymerization Procedure

1) Emulsify monomer kettle charge

2) Heat kettle charge to 82° C.

3) At 82° C. add initiator & monomer seed. Hold at 82° C. for 15'

4) Keeping at 82° C., feed the remainder of initiator and monomer over 3.5 h

5) After addition is completed, heat to 85° C. and hold for 30 minutes

6) Cool down to 65° C. then add chaser (dropwise-10'-dropwise-15')

7) Cool reactor and adjust latex pH to 9 with $NH_4OH$

| Raw materials | Concentration of raw material | Weight "as is" | Weight as solids | phm |
|---|---|---|---|---|
| Kettle Charge | | | | |
| Deionized Water | | 196.17 | | |
| Rhodapex LA40S, Rhodia (Surfactant) | 30 | 1.67 | 0.5 | 0.1 |
| Monomer Emulsion | | | | |
| Deionized Water | | 175.00 | | |
| Rhodafac RS610/A-25, Rhodia (Surfactant) | 25 | 20.00 | 5 | 1 |
| Rhodapex LA40S, Rhodia (Surfactant) | 30 | 15.00 | 4.5 | 0.9 |
| Comonomer tested | 30 | 16.67 | 5 | 1 |
| Styrene | 100 | 250 | 250 | 50 |
| Butyl Acrylate | 100 | 240 | 240 | 48 |
| AA | 100 | 10 | 10 | 2 |
| Initiator Solution | | | | |
| Deionized Water | | 100 | | |
| Ammonium Persulfate | 100 | 3 | 3 | 0.6 |
| Chaser Solutions | | | | |
| Water | | 5.00 | | |
| t-BHP | 70 | 0.71 | 0.5 | 0.1 |
| Water | | 5.00 | | |
| Erirtobic Acid | 100 | 0.50 | 0.5 | 0.1 |
| Total Solid (wt) | | | 519.00 | |
| Total Water (wt) | | | 519.71 | |
| Total Charge (wt) | | 1038.71 | | |

Evaluation of Scrub-Resistance of a Coating Comprising to Polymers

The coating composition (paint) detailed below is prepared (from pigment paste and mixing with the polymer dispersion), and applied onto Leneta Paper, with a Gardner Applicator with a Depth of Cut of 275 μm, to form a film. The film is dried according to the following accelerated procedure:

1) 24 h at 50% humidity at 23° C.
2) 24 h at 40° C. in Oven
3) 24 h at 50% humidity at 23° C.

| Ingredients in Pigment paste | Supplier | Nature of ingredient | Amount as is (g) |
|---|---|---|---|
| Water | | | 69.25 |
| Water | | | 37.34 |
| natrosol 250 hr | Aqualon | Cellulosic Thickeners | 0.76 |
| sodium hexametaphosphate | | Complexing Agent | 0.64 |
| Water | | | 5.79 |
| propyleneglycol | | | 3.79 |
| rhodoline dp 1120 | Rhodia | Dispersant | 1.73 |
| proxel bd20 | | Bactericide | 0.4 |
| rhodoline df 6002 | Rhodia | Defoamer | 1.16 |
| rhodoline rh 5220 | Rhodia | Associative Thickener | 0.8 |
| tiona rcl 595 | Millenium | Pigment | 20.23 |
| Socal p2 | Solvay | Calcium Carbonate | 52.07 |
| talc de luzenac 10 mo | Luzenac | Talc | 21.7 |
| durcal 10 | Omya | Calcium Carbonate | 69.45 |
| Calibrite sl | Omya | Calcium Carbonate | 69.45 |
| ammonia at 20% | | Base | 0.55 |
| rhodoline rh 5210 | Rhodia | Associative Thickener | 1.99 |
| Total | | | 357.1 |

The pigment volume concentration is of 82.

| Ingredients in Coating composition | Amount as is (g) |
|---|---|
| Pigment Paste | 312.46 |
| Tested Polymer dispersion (latex - 49% dry matter) | 34.84 |
| Texanol | 3.32 |

The scrub resistance of the coating is evaluated according:

to norm ISO 11998, except that the accelerated drying procedure above is carried out, and to norm DIN 53778, except that the accelerated drying procedure above is carried out.

According to Norm ISO 11998, the lower the value, the better the scrub resistance is (the value is an average thickness decrease after 200 scrubs).

According to Norm DIN 53778, the higher the value, the better the scrub resistance is.

The various data concerning the polymers and results of the evaluations therewith are presented on table I.

TABLE I

| | Example | | | |
|---|---|---|---|---|
| | 3C | 4C | 5 | 6 |
| Phosphate Monomer (1% in polymer) | None | A6835 | AAE3.5-P | AAE3.5-SP |
| ISO scrub resistance | 26 | 19 | 15 | 13 |
| DIN scrub resistance | 626 | 1295 | 1451 | 2326 |

The invention claimed is:

1. A copolymer comprising:

units A comprising an ethylenically unsaturated non-ionic water-insoluble monomer A, and units B comprising a monomer B of formula:

$$[CH_2{=}CH{-}CH_2{-}R^2{-}O{-}]_xP({=}O)(OM)_{3-x},$$

wherein:

$R^2$ is a linking divalent group, x is a number average number ranging from 1 to 2, and each M independently comprises a hydrogen atom or a cationic counter-ion;

and said copolymer has a glass transition temperature ranging from −20° C. to 60° C.

2. The copolymer of claim 1, wherein $R^2$ is a (poly)oxyalkylene group of formula $$-[O\text{-}A\text{-}]_n\text{-},\text{wherein:}$$

A independently comprises $-CH_2-CH_2-$, $-CH_2-CH(CH_3)-$, or $-CH(CH_3)-CH_2-$, and the average of n for monomer B comprising unit B is at least 1.

3. The copolymer of claim 1, wherein $R^2$ is a (poly)oxyethylene group of formula $[O-CH_2-CH_2]_n-$, wherein:

the average of n for monomer B comprising unit B ranges from 2 to 10.

4. The copolymer of claim 1, wherein:

the average value of x for monomer B comprising unit B ranges from 1 to 1.2.

5. The copolymer of claim 1, wherein the copolymer is an aqueous emulsion copolymer comprising from 0.05 to 10% by weight of units B.

6. The copolymer of claim 1, wherein monomer A comprises styrene, alkyl acrylate, or methacrylate, wherein the alkyl is a $C_1$-$C_{12}$ alkyl, or mixtures thereof.

7. The copolymer of claim 1, wherein the copolymer further comprises units C derivable from ethylenically unsaturated water-soluble monomer C.

8. The copolymer of claim 7, wherein units C are derivable from the following monomers comprising acrylamide, acrylic acid, methacrylic acid, or mixtures thereof.

9. The copolymer of claim 1, wherein the copolymer is an aqueous emulsion copolymer with an average particle diameter ranging from 70 to 500 nm.

10. A method of preparing the copolymer of claim 1, comprising the steps of:

preparing monomer B, and copolymerizing a mixture comprising monomer A and monomer B.

11. The method of claim 10, wherein the step of copolymerizing comprises free-radical polymerization.

12. The method of claim 10, wherein the step of preparing monomer B further comprises the step of phosphate esterifying a compound of formula $CH_2{=}CH-CH_2-R^2-OH$.

13. The method of claim 12, wherein the step of preparing monomer B further comprises the steps of:

A) preparing a phosphoric acid-alcohol reactant solution by dissolving from about 75 weight % to about 117 weight % phosphoric acid in a medium comprising an alcohol of formula $CH_2$═CH—$CH_2$—$R^2$—OH under essentially non-reactive temperature conditions;

B) blending into said reactant solution an effective amount of phosphoric anhydride ($P_2O_5$) to produce in situ a phosphate esterification reagent having an effective equivalent polyphosphoric acid weight percent ranging from about 118 to about 125; and C) reacting the phosphate esterification reagent with the alcohol medium at a temperature ranging from about 75° C. to about 100° C. for a reaction time ranging from about 4 to about 12 hours, wherein the average value of x for monomer B comprising the resulting phosphate ester composition is less then or equal to 1.2.

14. The method of claim 13, wherein:

the molar ratio between residual alcohol and monomer B is up to 20/80, the residual alcohol comprises up to 6% by weight of the reaction product, the molar ratio between residual (poly)phosphoric acid and monomer B is up to 30/70, and/or the residual (poly)phosphoric acid comprises up to 6% by weight of the reaction product.

15. A coating composition comprising the copolymer of claim 1, wherein the coating composition is in a dispersed or dried form.

16. The coating composition of claim 15, comprising the copolymer and at least one pigment, wherein the coating has a pigment volume concentration ranging from 20 to 95.

17. The coating composition of claim 15, wherein the composition is in a dispersed form and the polymer is in an emulsion form.

18. A substrate coated with the coating composition of claim 15.

19. The copolymer of claim 1, wherein $R^2$ is a (poly) oxyalkylene group.

20. The copolymer of claim 1, wherein the glass transition temperature ranges from 0° C. to 40° C.

21. The method of claim 11, wherein the step of copolymerizing comprises an emulsion polymerization step.

22. The method of claim 14, wherein the molar ratio between residual alcohol and monomer B is up to 25/75.

* * * * *

UNITED STATES PATENT AND TRADEMARK OFFICE

CERTIFICATE OF CORRECTION

PATENT NO. : 8,653,181 B2
APPLICATION NO. : 12/599198
DATED : February 18, 2014
INVENTOR(S) : Trezzi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this
Twenty-ninth Day of September, 2015

Michelle K. Lee
*Director of the United States Patent and Trademark Office*